US009262169B2

(12) United States Patent
Bonanno et al.

(10) Patent No.: US 9,262,169 B2
(45) Date of Patent: Feb. 16, 2016

(54) BRANCH PREDICTION TABLE INSTALL SOURCE TRACKING

(75) Inventors: James J. Bonanno, Wappingers Falls, NY (US); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 13/492,944

(22) Filed: Jun. 11, 2012

(65) Prior Publication Data

US 2013/0332712 A1    Dec. 12, 2013

(51) Int. Cl.
*G06F 9/30* (2006.01)
*G06F 9/38* (2006.01)

(52) U.S. Cl.
CPC ............ *G06F 9/3806* (2013.01); *G06F 9/3802* (2013.01); *G06F 9/3844* (2013.01)

(58) Field of Classification Search
CPC .................................................. G06F 9/3806
USPC ....................................................... 712/238
See application file for complete search history.

(56) References Cited

U.S. PATENT DOCUMENTS

| | | | |
|---|---|---|---|
| 6,397,326 B1 | 5/2002 | Horton et al. | |
| 6,477,639 B1 | 11/2002 | Krishnan et al. | |
| 6,697,937 B1 * | 2/2004 | Henry et al. | 712/240 |
| 6,721,877 B1 * | 4/2004 | Chen et al. | 712/239 |
| 6,886,093 B2 * | 4/2005 | Henry et al. | 712/239 |
| 6,938,151 B2 * | 8/2005 | Bonanno et al. | 712/239 |
| 7,152,154 B2 * | 12/2006 | McDonald | 712/238 |
| 7,434,037 B2 * | 10/2008 | Park et al. | 712/238 |
| 7,565,494 B1 * | 7/2009 | Todd et al. | 711/137 |
| 7,900,026 B2 * | 3/2011 | Park et al. | 712/239 |
| 8,166,279 B2 * | 4/2012 | Blaner et al. | 712/208 |
| 8,195,886 B2 * | 6/2012 | Ozer et al. | 711/133 |

(Continued)

OTHER PUBLICATIONS

Emma, et al., Comprehensive Branch Prediction Mechanism for BC, http://www.ip.com/pubview/IPCOM000065124D, Feb. 2005, 8 pages.

(Continued)

*Primary Examiner* — Andrew Caldwell
*Assistant Examiner* — Yuqing Xiao
(74) *Attorney, Agent, or Firm* — Cantor Colburn LLP; Margaret McNamara

(57) ABSTRACT

Embodiments relate to branch prediction table install source tracking. An aspect includes a system for branch prediction table install source tracking. The system includes memory configured to store instructions accessible by a processor. The processor includes a branch target buffer, where the processor is configured to perform a method. The method includes receiving at the branch target buffer a request to install a branch target buffer entry corresponding to a branch instruction for branch prediction, and identifying a source of the request as an install source of the branch target buffer entry. The method further includes storing an install source identifier in the branch target buffer based on the install source.

7 Claims, 6 Drawing Sheets

(56) References Cited

U.S. PATENT DOCUMENTS

| | | | |
|---|---|---|---|
| 2001/0047467 A1 | 11/2001 | Yeh et al. | |
| 2002/0199091 A1* | 12/2002 | Tago | G06F 9/3848 712/240 |
| 2004/0015683 A1* | 1/2004 | Emma et al. | 712/240 |
| 2004/0193843 A1* | 9/2004 | Altshuler et al. | 712/207 |
| 2004/0230780 A1* | 11/2004 | Prasky et al. | 712/238 |
| 2005/0204120 A1 | 9/2005 | Prasky et al. | |
| 2005/0257036 A1 | 11/2005 | Prasky et al. | |
| 2009/0144505 A1* | 6/2009 | Auemhammer et al. | 711/128 |
| 2009/0204798 A1 | 8/2009 | Alexander et al. | |
| 2010/0228957 A1* | 9/2010 | Rabinovitch et al. | 712/238 |

OTHER PUBLICATIONS

Eikenmeyer, et al., Improving Instruction Cache Branch Prediction With Target Addresses, http://www.ip.com/pubview/IPCOM000105409D; Jul. 1, 1993, 3 pages.

Burcea, et al., Phantom-BTB: A Virtualized Branch Target Buffer Design, ASPLOS '09 Proceedings of the 14th International Conference on Architectural Support for Programming Langagues & Operating Systems, 2009. ACM Sigplan Notices, vol. 44, Issue 3, Mar. 2009, 11 pages.

* cited by examiner

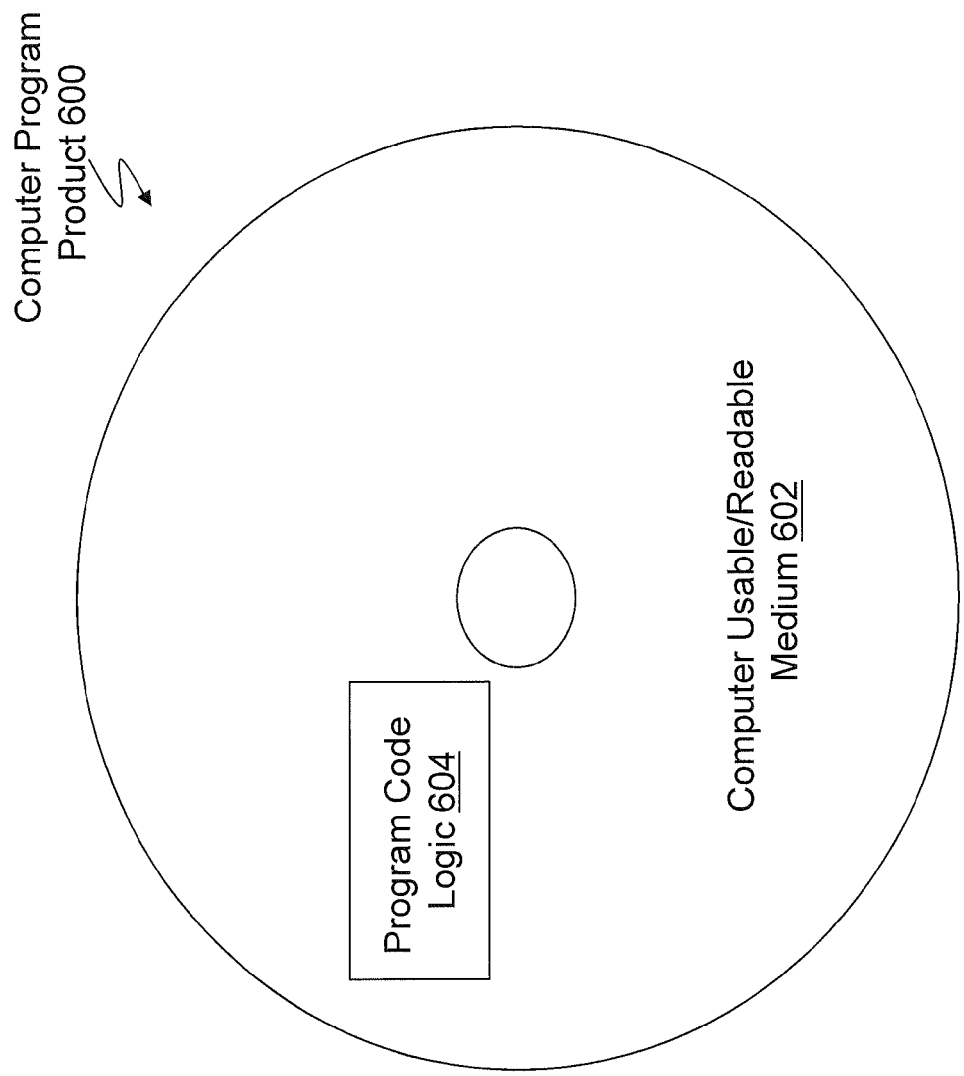

BRANCH PREDICTION TABLE INSTALL SOURCE TRACKING

BACKGROUND

The present invention relates generally to computer processing systems, and more specifically, to branch prediction table install source tracking.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. Branch target prediction attempts to guess, based on prior execution result, a target of a taken conditional or unconditional branch before it is computed by decoding and executing the instruction itself. A branch target may be a computed address based on an offset and/or an indirect reference through a register A branch target buffer (BTB) is used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include, but are not limited to, a branch history table and a pattern history table for predicting the direction of the branch. A branch history table can predict the direction of a branch (taken vs. not taken) as a function of the branch address. A pattern history table can assist with direction prediction by associating a direction prediction for the given branch with the path of branches that was encountered in reaching the given branch that is to be predicted.

SUMMARY

Exemplary embodiments include a system for branch prediction table install source tracking. The system includes memory configured to store instructions accessible by a processor. The processor includes a branch target buffer, where the processor is configured to perform a method. The method includes receiving at the branch target buffer a request to install a branch target buffer entry corresponding to a branch instruction for branch prediction, and identifying a source of the request as an install source of the branch target buffer entry. The method further includes storing an install source identifier in the branch target buffer based on the install source.

Further exemplary embodiments include a computer-implemented method for branch prediction table install source tracking. The method includes receiving at a branch target buffer a request to install a branch target buffer entry corresponding to a branch instruction for branch prediction. The method further includes identifying, by a computer, a source of the request as an install source of the branch target buffer entry. The method also includes storing, by the computer, an install source identifier in the branch target buffer based on the install source.

Additional exemplary embodiments include a computer program product for branch prediction table install source tracking. The computer program product includes a tangible storage medium readable by a processing circuit including a branch target buffer and storing instructions for execution by the processing circuit for performing a method. The method includes receiving at the branch target buffer a request to install a branch target buffer entry corresponding to a branch instruction for branch prediction. The method also includes identifying, by the processing circuit, a source of the request as an install source of the branch target buffer entry. The method further includes storing, by the processing circuit, an install source identifier in the branch target buffer based on the install source.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 6 depicts a computer-readable medium according to an embodiment.

DETAILED DESCRIPTION

Exemplary embodiments provide branch prediction table install source tracking. A branch target buffer (BTB) can include a number of structures and buffers to support multi-level branch target prediction. For example, a BTB can include a primary BTB and a higher-level BTB. The BTB can also support multiple installation sources, such as a surprise install, a higher-level BTB install, a software preload install, and a victim install from a victim entries table. Tracking the install source enables BTB entries from different install sources to be treated differently. For example, those branches which have executed, for the first time, and been installed as BTB entries are known to be in the executed instruction stream, while branches preloaded by software may be speculative as to which way the program will execute in the future. Tracking install sources can also provide feedback to software to assist in understanding and modifying software preload patterns, which may improve compiler optimization.

Figure 1:
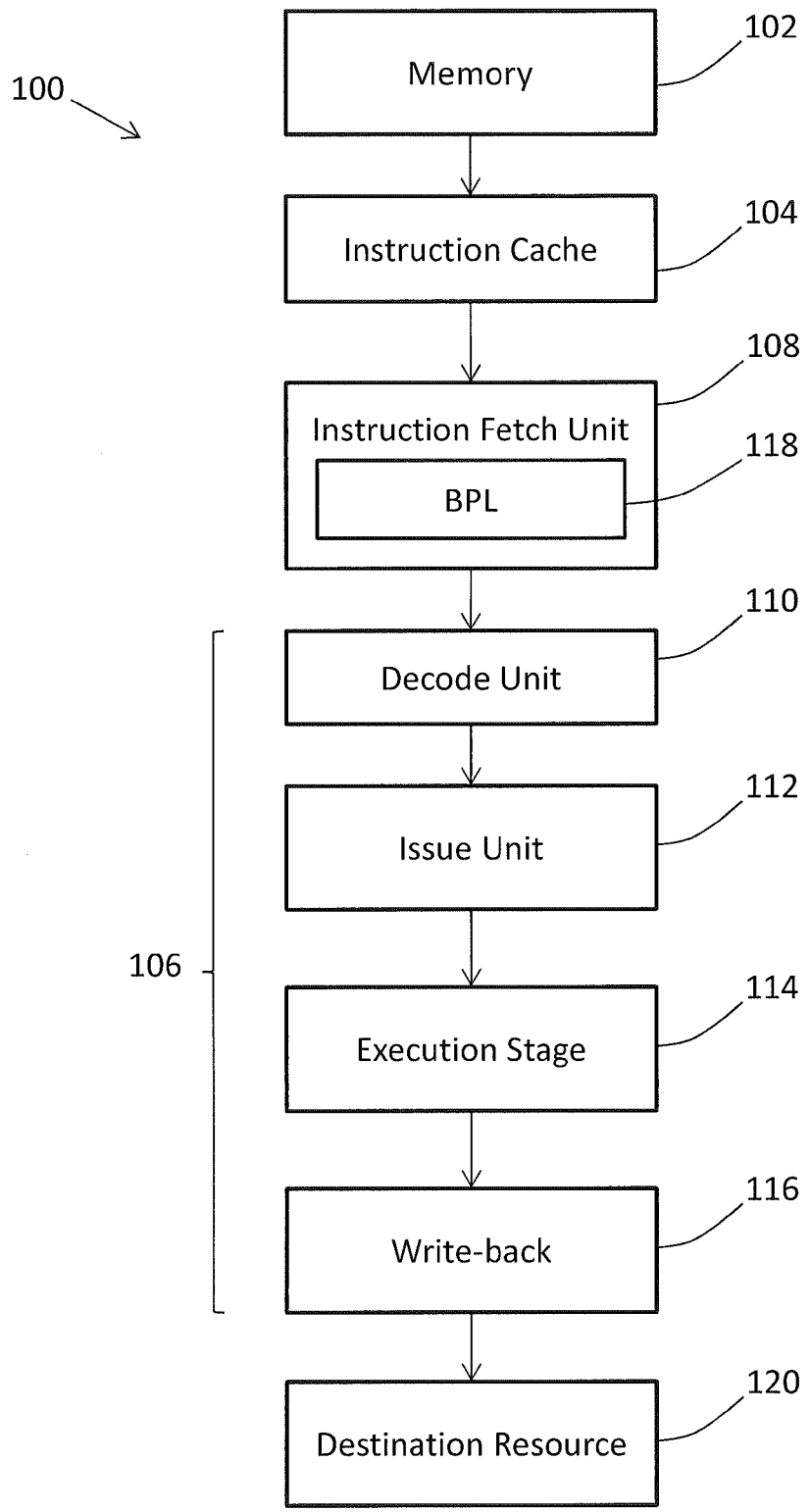
FIG. 1 depicts a processing system according to an embodiment.

FIG. 1 depicts a block diagram a processing system 100 according to an embodiment. The processing system 100 includes a memory 102, an instruction cache 104, an instruction fetch unit 108, and a processing pipeline 106. The processing system 100 may be included within a computer processor or otherwise distributed within a computer system. Instructions and data can be stored in memory 102, and the instruction cache 104 may access instructions in memory 102 and store the instructions to be fetched. The memory 102 may include any type of volatile or non-volatile memory, such as cache memory. The memory 102 and instruction cache 104 can include multiple cache levels. A data cache (not depicted) may also be included in the processing system 100.

In FIG. 1, a simplified example of the instruction fetch unit 108 and the processing pipeline 106 are depicted. The processing system 100 can further include multiple processing pipelines 106 and instruction fetch units 108. The processing pipeline 106 includes a decode unit 110, an issue unit 112, an execution stage 114, and write-back logic 116. The instruction fetch unit 108 may also be part of the processing pipeline 106. The processing pipeline 106 can include other features, such as error checking and handling logic, one or more parallel paths through the processing pipeline 106, and other features known in the art. While a forward path through the processing system 100 is depicted in FIG. 1, other feedback and signaling paths may be included between elements of the processing system 100.

The instruction fetch unit 108 fetches instructions from the instruction cache 104 for further processing by the decode unit 110. The instruction fetch unit 108 is an example of a processing circuit to implement branch prediction table install source tracking. In an exemplary embodiment, the instruction fetch unit 108 includes Branch Prediction Logic (BPL) 118. Alternatively, the BPL 118 may be located separately from the instruction fetch unit 108. The instruction fetch unit 108 can also include other branch prediction logic beyond that depicted in FIG. 2, such as a multiple target table and a branch history table.

The decode unit 110 decodes instructions and passes the decoded instructions, portions of instructions, or other decoded data to the issue unit 112. The issue unit 112 analyzes the instructions or other data and transmits the decoded instructions, portions of instructions, or other data to one or more execution units in the execution stage 114 based on the analysis. The execution stage 114 executes the instructions. The execution stage 114 may include a plurality of execution units, such as fixed-point execution units, floating-point execution units, load/store execution units, and vector execution units. The write-back logic 116 writes results of instruction execution back to a destination resource 120. The destination resource 120 may be any type of resource, including registers, cache memory, other memory, I/O circuitry to communicate with other devices, other processing circuits, or any other type of destination for executed instructions or data.

Figure 2:
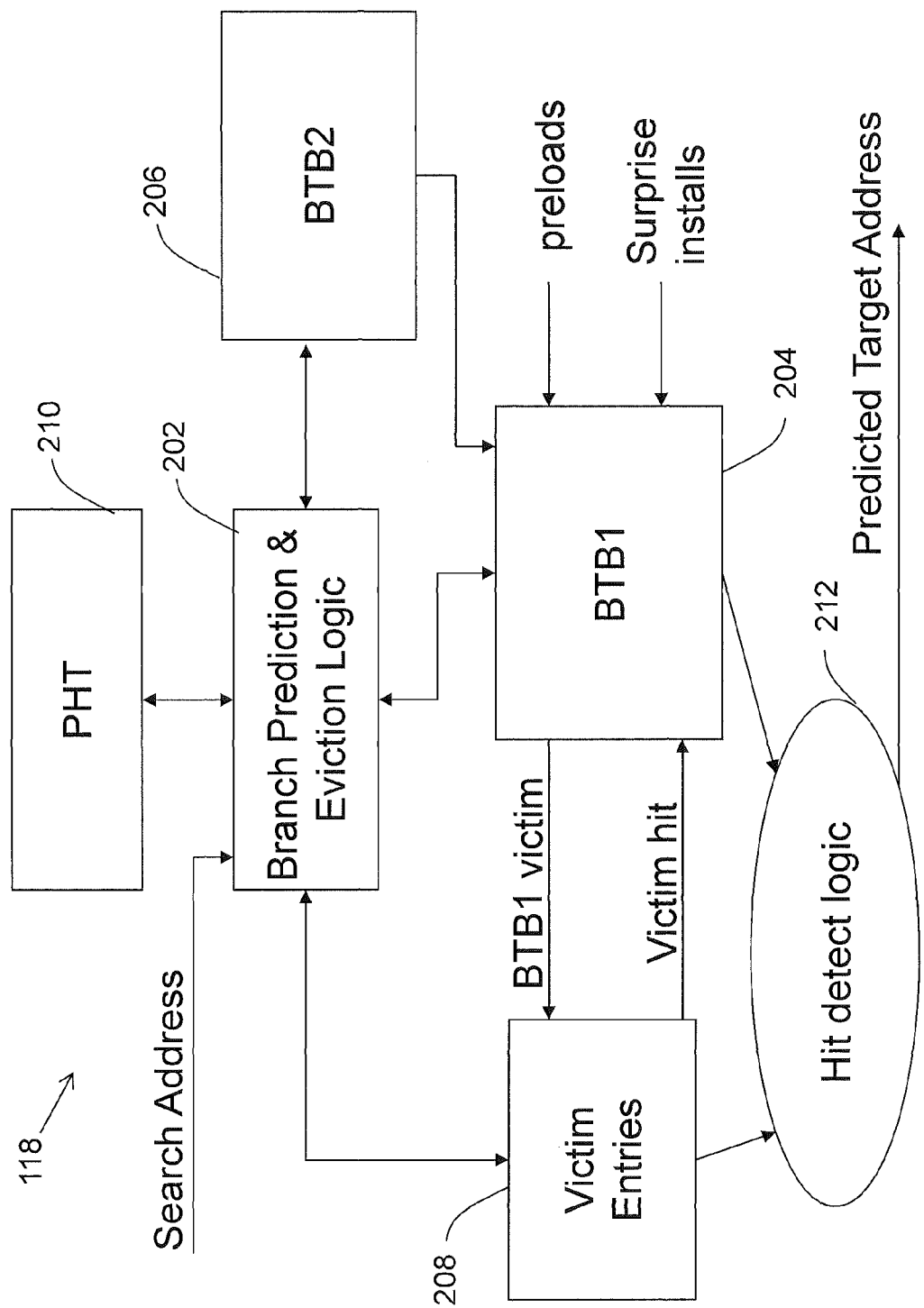
FIG. 2 depicts branch prediction logic according to an embodiment.

FIG. 2 depicts an example of the BPL 118 of FIG. 1 in greater detail. The example BPL 118 of FIG. 2 is set associative, including multiple sets (columns) of BTB entries. The BPL 118 includes branch prediction and eviction logic 202, BTB1 204, BTB2 206, victim entries 208, pattern history table 210, and hit detection logic 212. The branch prediction and eviction logic 202 can control access and updates of BTB entries in the BTB1 204, BTB2 206, and victim entries 208, as well as movement of BTB entries between the BTB1 204, BTB2 206, and victim entries 208. In an exemplary embodiment, BTB1 204 is a primary BTB, BTB2 206 is a higher-level BTB, and victim entries 208 is a table of BTB entries removed from the primary BTB. In the example of FIG. 2, BTB installs are performed primarily through BTB1 204; however, in other embodiments, BTB installs can be performed relative to other BTB structures, such as direct installation into BTB2 206 or victim entries 208.

Figure 3:
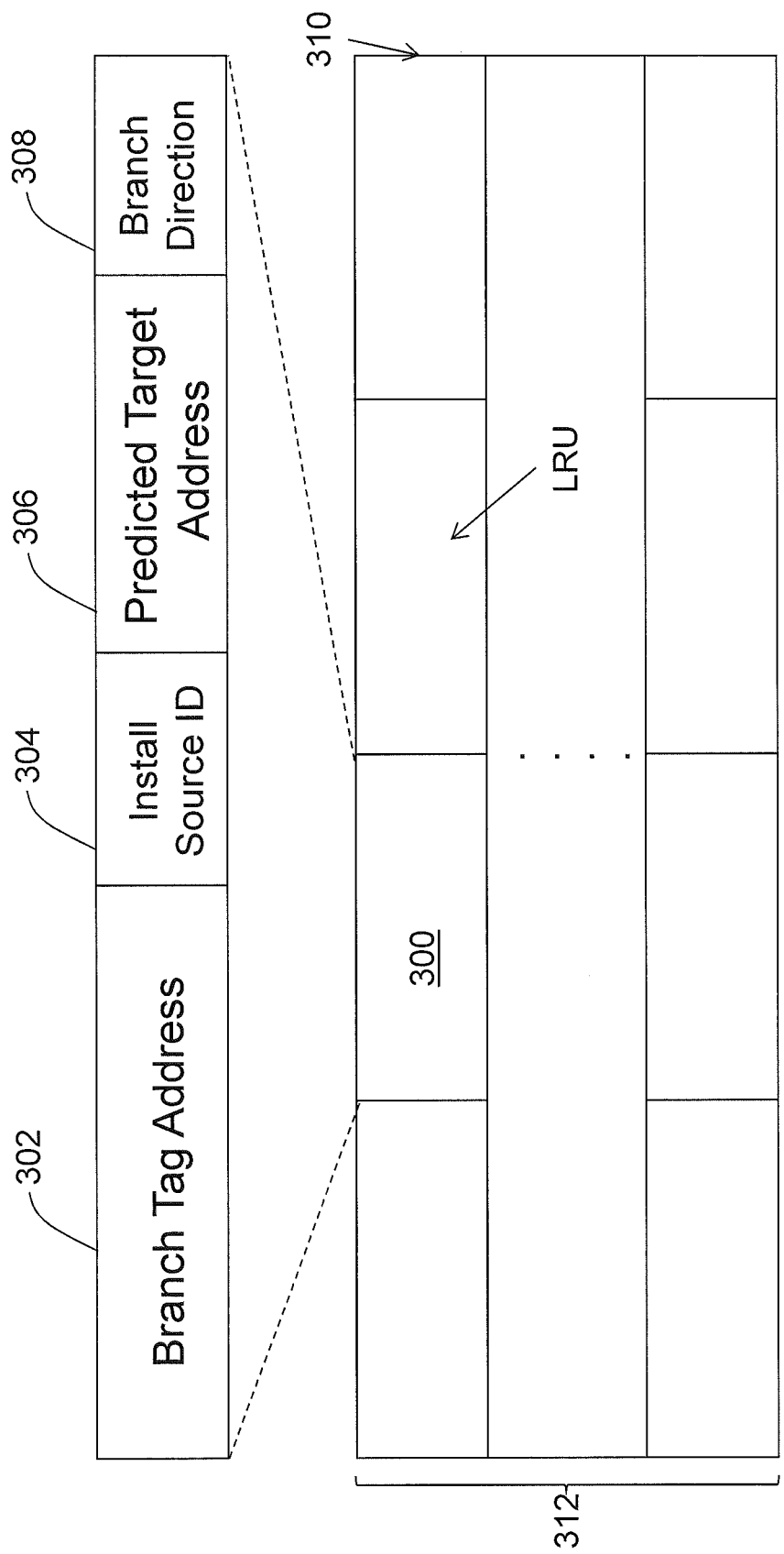
FIG. 3 depicts a branch target buffer entry according to an embodiment.

A generic example of a BTB entry is depicted in FIG. 3 as BTB entry 300 (also referred to as entry 300), which includes a branch tag address 302, an install source ID field 304, a predicted target address 306, and a branch direction 308. With continued reference to FIGS. 1-3, the branch tag address 302 is used to locate an entry within a BTB row 310, where each of the BTB1 204, BTB2 206, and victim entries 208 can include multiple BTB rows 312 and multiple set associative BTB entries per BTB row 310. Each BTB row 310 is also referred to as a congruence class. A least recently used identifier (LRU) can also be tracked to assist in determining which BTB entry 300 was least recently used for removal/replacement of entries. The install source ID field 304 identifies an install source such as one of: a surprise install from the processing pipeline 106 of FIG. 1, a higher-level BTB install from BTB2 206, a software preload install, and a victim install from victim entries 208. The branch direction 308 can indicate whether the associated branch is to be guessed/predicted taken or not taken.

In an exemplary embodiment, an address of an instruction fetch by the instruction fetch unit 108 of FIG. 1 is used as a search address to access the BPL 118 and predict any associated branch and if taken then also predict the branch's target address. BTB1 204 can contain primary BTB entries of interest for predicting branch target addresses. BTB2 206 can include a larger number of BTB entries, but the entries may be acquired in large blocks that include a subset of the branches which would be stored in the BTB1 204. BTB entries from the BTB2 206 can be installed in the BTB1 204 based on failing to locate a BTB entry in the BTB1 204. The victim entries 208 can include BTB entries that have been recently evicted from the BTB1 204 by the branch prediction and eviction logic 202. When a BTB entry is evicted from BTB1 204, it is written as a BTB1 victim to the victim entries 208. Eviction can be based on monitoring for least recently used BTB entries and determining which locations in the BTB1 204 to overwrite based on receiving an installation request from an install source. The victim entries 208 and the BTB1 204 can both provide input to hit logic 212 to determine whether a match or "hit" is located based on the search address. If a match is found, the hit logic 212 outputs a predicted target address. If the match was from the victim entries 208 (a victim hit), the corresponding BTB entry can be returned to the BTB1 204 as a victim install, such that the most recent and relevant branch target predictions are maintained in the BTB1 204.

The branch prediction and eviction logic 202 may also manage other branch prediction functions/predictors, such as maintaining the PHT 210 by monitoring for recurring branch patterns in a branch sequence. The branch prediction and eviction logic 202 can also make prediction, eviction, and blocking decisions based on the install source ID field 304 and branch direction 308 of a BTB entry 300.

Figure 4:
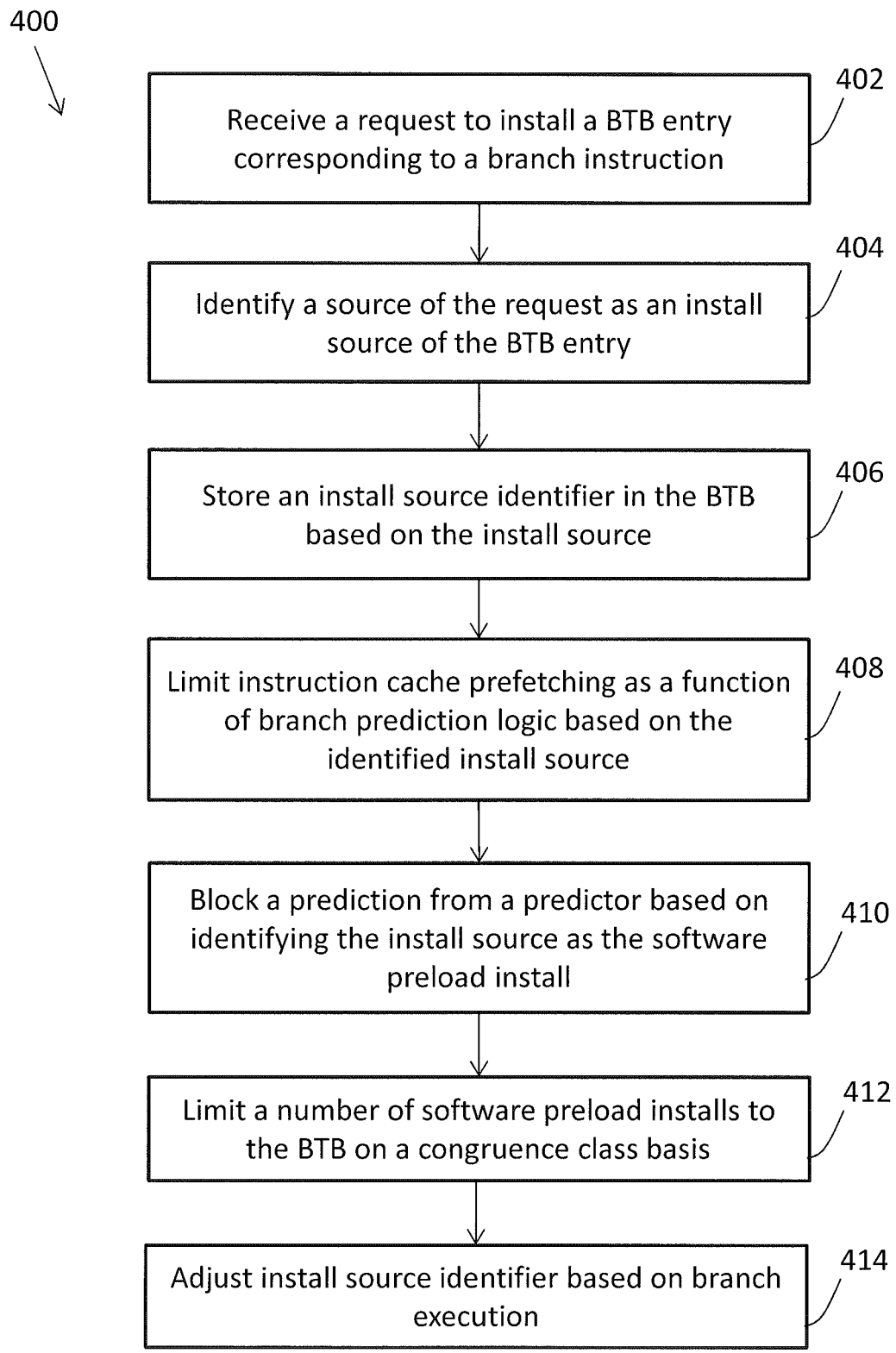
FIG. 4 is a flowchart illustrating a process of branch prediction table install source tracking according to an embodiment.

Turning now to FIG. 4, a process 400 of branch prediction table install source tracking will now be described in an exemplary embodiment. The process 400 is described in reference to FIGS. 1-3 and can be implemented by the BPL 118 of FIGS. 1 and 2.

At block 402, the BPL 118 receives a request to install a BTB entry corresponding to a branch instruction for branch prediction. At block 404, branch prediction and eviction logic 202 identifies the source of the request as an install source of the BTB entry in BTB1 204. For example, the install source can be one of: a surprise install from the processing pipeline 106 of FIG. 1, a higher-level BTB install from BTB2 206, a software preload install, and a victim install from victim entries 208.

At block 406, the branch prediction and eviction logic 202 stores an install source identifier in BTB1 204 based on the install source. The install source identifier is stored in an install source ID field 304 in a BTB entry 300 of the BTB1 204. A read request of the install source identifier for the BTB entry 300 is subsequently received. The read request may be associated with a software based request for instrumentation or from branch prediction logic, such as branch prediction and eviction logic 202. The install source identifier can be provided from the install source ID field 304 based on the read request.

At block 408, prefetching of the instruction cache 104 of FIG. 1 as a function of a predicted branch target by the branch prediction logic 118 may be limited based on the identified install source. For example, prefetching may be prevented for a software preload install, since prefetching may have already been performed at the time of the preload. As a further example, prefetching of the instruction cache 104 of FIG. 1 may also be blocked for a surprise install if the BTB entry 300 is identified as a most recently used (MRU) entry, but prefetching of the instruction cache 104 of FIG. 1 can be performed if the most recently used BTB entry 300 indicates that the install source is a higher-level BTB install from BTB2 206. Furthermore, blocking of prefetching of the instruction cache 104 of FIG. 1 may also be performed based on a victim. For instance, a branch target address of a victim entry may already be associated with an entry in the BTB1 204.

At block 410, a direction prediction from a predictor, such as the PHT 210, can be blocked thereby basing the direction prediction on the branch direction history of the BTB1 204 based on identifying the install source as the software preload install. The PHT 210 can be blocked since the PHT 210 may not contain enough pattern information about the preloaded branch yet.

At block 412, a number of sets within the BTB1 204 that can contain software preload installs is limited. As such, a given congruence class (e.g., BTB row 310) may be at its limit of preloads, but another congruence class may be able to handle further branch preloads. This can prevent software from dominating BTB entries with preloads. Blocking additional software preloads may include partially flushing the BTB1 204 based on determining that the maximum number of software preloads to the BTB1 204 has been performed for a given BTB row 310 or rows 312.

At block 414, the install source identifier 304 can be reset to a surprise install based on execution of the branch instruction corresponding to the BTB entry 300. Alternatively, the install source identifier 304 can be reset to a branch executed state indicating that the corresponding branch has been executed at least once. This may influence which upper levels of BTB hierarchy can acquire lower-level branch entries.

Figure 5:
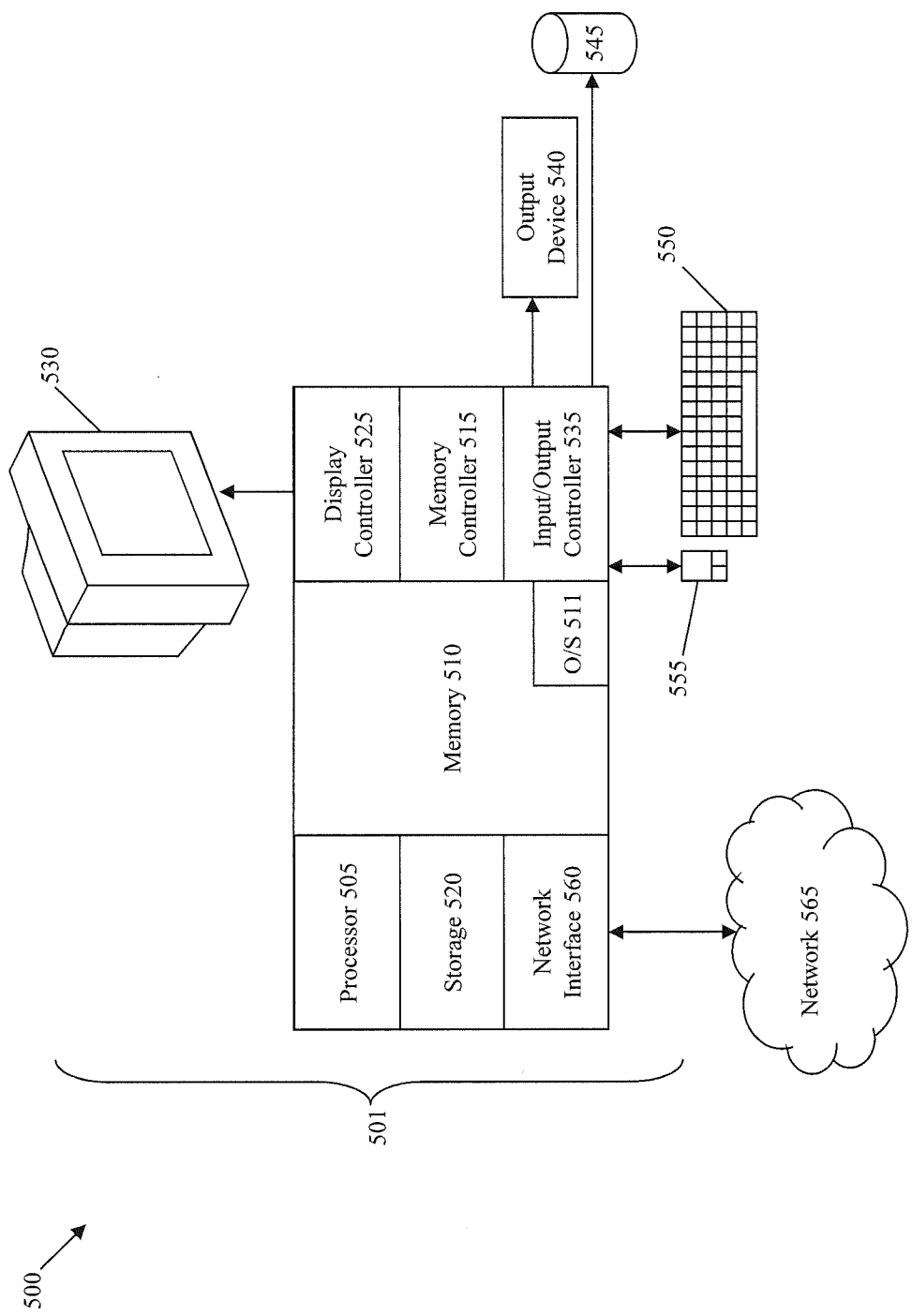
FIG. 5 depicts a computing system according to an embodiment.

FIG. 5 depicts a block diagram of a system 500 for branch prediction table install source tracking in a processor 505. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 500 therefore includes general-purpose computer 501 as illustrated in FIG. 5.

In an exemplary embodiment, in terms of hardware architecture, as shown in FIG. 5, the computer 501 includes a processor 505 which is a processing circuit that includes the processing pipeline 106 of FIG. 1 and a BPL 118. The computer 501 further includes memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 610 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 a suitable operating system (OS) 511. The operating system 511 essentially controls the execution of other computer programs and provides scheduling, input-output control, file and data management, memory management, and communication control and related services.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to fetch and execute instructions stored within the memory 510, to communicate data to and from the memory 510, and to generally control operations of the computer 501 pursuant to the instructions.

In an exemplary embodiment, where the BPL 118 of FIG. 2 is implemented in hardware, the methods described herein, such as process 400 of FIG. 4, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Referring now to FIG. 6, in one example, a computer program product 600 includes, for instance, one or more storage media 602, wherein the media may be tangible and/or non-transitory, to store computer readable program code means or logic 604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include branch prediction table install source tracking. By tracking an install source, enhanced control to instruction cache prefetching and prediction table usage can be provided. Tracking install sources can also aid in balancing of installs into a branch target buffer and may provide feedback to software which can be used for compiler optimization and other functions.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for branch prediction table install source tracking, the system comprising:
   memory configured to store instructions accessible by a processor; and
   the processor comprising a branch target buffer, a higher-level branch target buffer that is larger than the branch target buffer and acquires blocks of branch target buffer entries that include a subset of branches to be stored in the branch target buffer, a pattern history table that monitors for recurring branch patterns to make predictions, and a processing pipeline operable to decode and execute the instructions, wherein the processor is configured to perform a method comprising:
   receiving at the branch target buffer a request to install a branch target buffer entry corresponding to a branch instruction for branch prediction;
   identifying a source of the request as an install source of the branch target buffer entry;
   storing an install source identifier in the branch target buffer based on the install source; and
   blocking a prediction from the pattern history table based on the install source identifier in the branch target buffer indicating that a software preload install is the install source.

2. The system of claim 1, wherein the install source identifier is stored in an install source identifier field of the branch target buffer entry, and the processor is configured to perform:
   receiving a read request of the install source identifier for the branch target buffer entry; and
   providing the install source identifier from the install source identifier field based on the read request.

3. The system of claim 1, wherein the install source is one of: a surprise install as an install originating from the processing pipeline, a higher-level branch target buffer install from the higher-level branch target buffer, the software preload install, and a victim install from a victim entries table.

4. The system of claim 3, the system further comprising an instruction cache, wherein the processor is configured to perform:
   limiting instruction cache prefetching as a function of a predicted branch target by branch prediction logic based on one of: identifying the software preload install as the install source, identifying the surprise install as the install source where the branch target buffer entry is identified as a most recently used entry, and identifying the victim install as the install source from the victim entries table.

5. The system of claim 3, wherein the processor is configured to perform:
   limiting a number of branch target buffer entries identified as the software preload installs on a branch target buffer row basis, each branch target buffer row comprising multiple set associative branch target buffer entries.

6. The system of claim 3, wherein the processor is configured to perform:
   resetting the install source identifier to the surprise install based on execution of the branch instruction corresponding to the branch target buffer entry.

7. The system of claim 1, wherein the processor is configured to perform:
   resetting the install source identifier to a branch executed state based on execution of the branch instruction corresponding to the branch target buffer entry.

* * * * *